United States Patent [19]
Krymsky

[11] Patent Number: 5,908,493
[45] Date of Patent: Jun. 1, 1999

[54] FILTERING SYSTEM FOR CLEANING AIR

[76] Inventor: Mark D. Krymsky, 412 Whittier Dr., Langhorne, Pa. 19053

[21] Appl. No.: 08/971,738

[22] Filed: Nov. 17, 1997

[51] Int. Cl.[6] .................................................. B01D 47/02
[52] U.S. Cl. ........................... 96/333; 15/353; 96/336; 96/347; 96/349; 55/DIG. 3
[58] Field of Search ................. 95/219, 226; 55/DIG. 3, 55/467, 473; 96/333, 336, 348, 349, 350, 347, 355, 359, 366; 15/347, 350, 353

[56] References Cited

U.S. PATENT DOCUMENTS

| | | | |
|---|---|---|---|
| 941,676 | 11/1909 | Green | 96/334 |
| 1,363,859 | 12/1920 | Fetters et al. | 96/348 |
| 2,102,705 | 12/1937 | Henderson et al. | 96/348 |
| 2,114,780 | 4/1938 | Juelson | 96/359 |
| 2,184,731 | 12/1939 | Brewer | 96/359 |
| 2,221,572 | 11/1940 | Brock et al. | 183/25 |
| 2,228,750 | 1/1941 | Brock | 183/77 |
| 2,233,167 | 2/1941 | Holm-Hansen | 96/347 |
| 2,306,212 | 12/1942 | Gerstmann | 96/349 |
| 2,527,439 | 10/1950 | McGuire | 96/337 |
| 2,886,127 | 5/1959 | Brock | 183/37 |
| 2,943,698 | 7/1960 | Bishop | 55/DIG. 3 |
| 2,945,553 | 7/1960 | Brock | 183/24 |
| 3,234,713 | 2/1966 | Harper et al. | 55/DIG. 3 |
| 3,320,727 | 5/1967 | Farley et al. | 55/DIG. 3 |
| 4,172,710 | 10/1979 | Van Der Molen | 55/DIG. 3 |
| 4,251,241 | 2/1981 | Bothun | 55/DIG. 3 |
| 4,547,206 | 10/1985 | Sovis et al. | 55/DIG. 3 |
| 4,573,236 | 3/1986 | Dyson | 15/333 |
| 4,640,697 | 2/1987 | Erickson, Jr. | 55/248 |
| 4,643,748 | 2/1987 | Dyson | 55/338 |
| 4,824,333 | 4/1989 | Erickson, Jr. | 417/360 |
| 4,826,515 | 5/1989 | Dyson | 55/345 |
| 4,853,008 | 8/1989 | Dyson | 55/345 |
| 4,874,404 | 10/1989 | Boswell | 95/226 |
| 5,078,761 | 1/1992 | Dyson | 55/213 |
| 5,145,499 | 9/1992 | Dyson | 55/337 |
| 5,160,356 | 11/1992 | Dyson | 55/345 |
| 5,199,963 | 4/1993 | Scarp | 96/350 |
| 5,354,347 | 10/1994 | Mccoy et al. | 96/350 |
| 5,776,215 | 7/1998 | Amoretti | 96/278 |
| 5,779,745 | 7/1998 | Kilstrom | 55/DIG. 3 |

*Primary Examiner*—Duane S. Smith
*Attorney, Agent, or Firm*—Norman E. Lehrer

[57] ABSTRACT

The present invention is a three stage water-from-air-filter system which can be used in combination with substantially any household vacuum cleaner. The system includes a main cylindrically shaped body and a hollow cylinder within the main body. The main body and cylinder form a ring-shaped chamber. The chamber has a spherical bottom partially filled with water. The hollow cylinder is made of a large pipe and a small pipe. The large pipe has an areohydrodynamic separator. An entrance nozzle may be located on either the main body or on the small pipe. Regardless of where the nozzle is located, polluted air enters the ring-shaped chamber through the nozzle. In the chamber the air mixes with the water. The air and water mixture is centrifugally separated several times through the concentric cylinders within the filter system to ensure a high quality of cleaning.

17 Claims, 6 Drawing Sheets

FILTERING SYSTEM FOR CLEANING AIR

BACKGROUND OF THE INVENTION

The present invention is directed toward a multi-stage water filter and, more particularly, to a system for treating polluted air by impinging the air against a liquid surface, causing the air and liquid to mix and thereafter separating the air from the liquid several times, thereby ensuring high quality cleaning.

Most portable vacuum cleaners have two main units: a fan for suctioning polluted air and some system for cleaning the air of various particles and dust, typically a filter. Portable vacuum cleaners used in households for cleaning carpets, upholstered furniture, bare floors, walls, etc., are characterized by two main features: the ability to suction, i.e., the maximum weight of particles that may be suctioned, and the ability of the filter unit to retain all of the various particles. The ability to suction depends on the velocity of air flow entering the machine. The air flow is what captures all the loose particles from a surface and suctions them into the machine. The velocity of the air flow, other than the power of the motor and the design of the fan, depends on the resistance it meets inside the machine from the entryway to the exit.

Household cleaner filters are typically bags made from paper or fabric and are the most commonly used for cleaning the contaminated air from particulate matter (Consumer Reports: Vacuum Cleaners 1995; Mody, Jakhete Dust Control Handbook Pollution Technology Review #161, Noyes Data Corporation.) Other types of filters are cyclones and liquid filter systems.

Bags, as elements for catching dust have one well known disadvantage. That is, the smaller the pores in the bag, the finer the dirt particles they are able to catch. However, this creates a greater resistance against the exiting air flow which slows it and reduces the vacuum cleaner's suction ability. Furthermore, it is impossible to catch every particle of dust with a filter bag since only a nonporous bag will catch every particle, which is what eventually becomes of the bag once it is clogged, therefore completely stopping the air flow which catches the particles. It should also be noted that all particles that are suctioned in and not retained are released back into the environment. The smaller the particles, the more dangerous they are to humans.

Cyclones are inertial collectors which transform a gas stream into a confined vortex, from which inertia moves suspended particles to the wall of the cyclone's body. Cyclones have a significantly lesser resistance than bags, but they can only capture particles larger than 5 microns (1992 ASHRAE Handbook for Heating, Ventilating, and Air Conditioning System and Equipment, SI Edition, p. 26.7.) In FANTOM vacuum cleaner machines disclosed in U.S. Pat. Nos. 4,573,236; 4,643,748; 4,826,515; 4,853,008; 5,078,761; 5,145,499; and 5,160,356, a common porous filter is used to seize particles smaller than 5 microns but these filters have the same disadvantages as filter bags, discussed above.

Wet scrubbers and water filters used for air cleaning exist in two varieties. The first has a continuous feeding of water into the stream of contaminated air and a constant removing of the sludge. The second has a periodic feeding of water and a periodic removal of the sludge. Portable household cleaners usually use the second type. Water can capture finer particles, as small as 0.3 micron. However, these particles can only be captured by passing the contaminated air through liquid (1992 ASHRAE Handbook for Heating, Ventilating, and Air Conditioning System and Equipment, SI Edition p. 26.15). Furthermore, water filtration has a lesser resistance to the air flow than bags or other filters.

The vacuum cleaner "Rainbow" (Rexair, Inc.) is described in U.S. Pat. Nos. 2,221,572; 2,228,750; 2,886,127; 2,945,553; 4,640,697; and 4,824,333. This machine basically consists of a water basin, an electrical motor which drives a system of centrifugal fans suctioning in the contaminated air into the water basin, and a spinning separator which separates clean air from the water. A spinning hollow cone-shaped cup with slits on the sides perpendicular to the direction of rotation is used as a separator. The same motor that drives the fan system functions as the drive for the spinning separator. The contaminated air enters the water basin through a nozzle directed perpendicularly to the surface of the water.

This Rainbow device, however, has a number of disadvantages. First, it results in a low quality of air cleaning due to poor mixing of the contaminated air and water since the shortest path from the nozzle to the separator is by avoiding the water surface altogether, and because the air suctioned in has a low kinetic energy and a low impulse of force. If the nozzle end is placed lower than the water surface, an evacuation of air above the water surface occurs and the whole mass of water goes into the separator which cannot possibly separate it from the air. Consequently, many of the later filed "Rainbow" patents include an above-the-surface nozzle. According to "Consumer Reports," 1995, Rainbow holds the finest dust, like household dirt, well, but cannot catch most mineral particles which are not easily wetted, and therefore emits them into the air again.

Secondly, the mechanically rotating separator requires a complicated mechanical drive and is unreliable because of the large number of parts rotating at great speeds. Other than that, wet or damp dust, and other various debris, sticks to the separator clogging its slits.

In addition, the spinning slotted separator of the Rainbow vacuum cleaner has a relatively high aerodynamic resistance lowering the suctioning ability of the vacuum cleaner.

SUMMARY OF THE INVENTION

The present invention is designed to overcome the deficiencies of the prior art and includes a multi-stage water filter through which water is periodically fed and from which sludge is periodically removed. This device performs two main functions. First, it thoroughly mixes contaminated air with the water which effects how clean it will be. Second, it separates and collects all the water out of the mixture. The ability to separate the water out, for the further cleaning of air, affects the duration of the working time of the cleaner.

As noted above, the closest prior art to the present device is believed to be the Rainbow vacuum cleaner, which also uses liquid to retain pollutants. But compared to the Rainbow, the present device has a number of advantages.

Forced, contaminated air has a larger impulse of force (Ft) than air being suctioned in as in the Rainbow system. The impulse of force is determined by the time (t) the fan reacts with the air and determines the quantity of the air movement: $mV=Ft$, which in turn determines the kinetic energy (E) of the air $E=mV^2/2$ (F—the force of the fan reacting with the air, t—length in time of the interaction, m—air mass, V—the air velocity, E—kinetic energy).

Kinetic energy is used to form the water and air mixture, once the air hits the water's surface. In this way, having more kinetic energy, the air provides a more even mixture with a larger area of interaction between the air and the water. This ensures a better quality of air cleaning.

Secondly, the low aerodynamic resistance offered by this water filter and, accordingly, the high velocity of the air flow, not only ensures the vacuum cleaner a high suctioning ability, but also a high amount of kinetic energy in the air, which thereafter ensures an even mixture of air and water and a better way to rid the air of pollution.

In addition, unlike the Rainbow, beside the water filtration, an ordinary centrifugal separation of particles from the air occurs in the present device because of a tangent feeding of air into a ring-shaped chamber. This is especially important for large particles such as silica and talc, which cannot be moistened by water, and are therefore not captured by the Rainbow machine (Consumer Reports: Vacuum Cleaners, 1995).

Unlike dry cyclones, in the present invention the separation takes place in a ring-shaped chamber, not a cylindrical chamber. This ensures circular air flow in one direction which significantly improves the quality of its cleaning.

Furthermore, the present invention has a concentric chamber design which not only makes the device compact, it also creates a three step water-from-air separation system which replaces the rotating slotted separator. This lowers the aerodynamic resistance to the air flow, enhances the separating ability, and eliminates the clogging of the separator.

Even further, in the present invention, movable parts are absent which makes it much more simple and much more reliable. Additionally, the present invention has a spherically shaped bottom and forced air is fed into the filter, instead of suctioning the air in. Thus, the multi-stage water filter can work at an inclined position. For instance, it can be fixed onto the handle of existing upright household vacuum cleaners.

The water filter of the present invention can replace bag filters and cyclones in existing vacuum cleaners, as well as being used on its own.

Other objects, features, and advantages of the invention will be readily apparent from the following detailed description of the preferred embodiments thereof taken in conjunction with the drawings.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

DETAILED DESCRIPTION OF THE PREFERRED EMBODIMENTS

Figure 1:
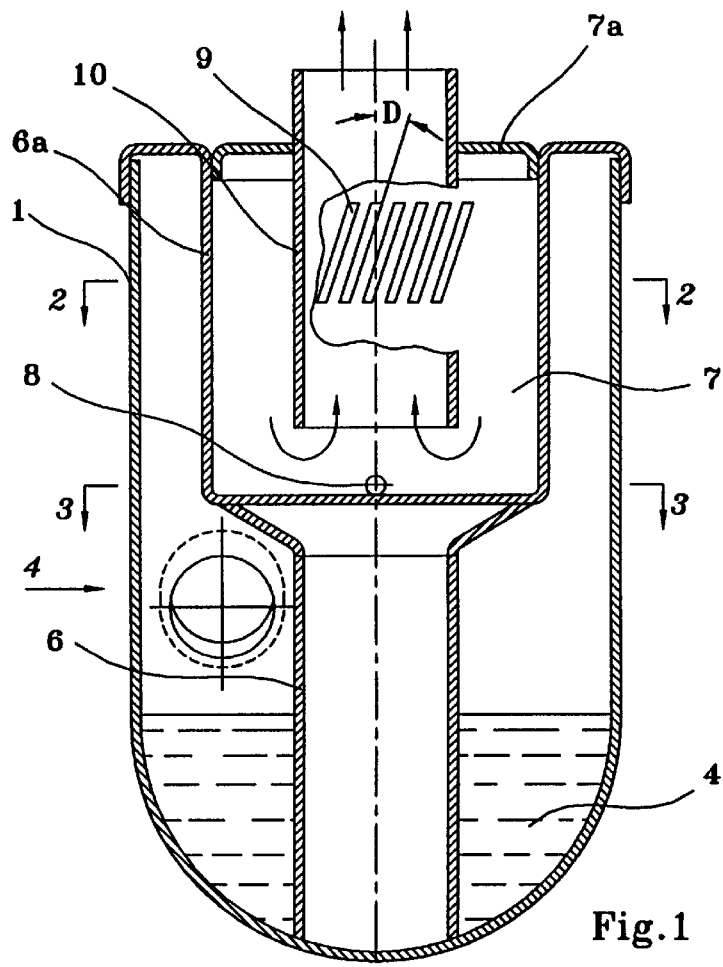
FIG. 1 is a first embodiment of the present invention for cleaning air with an entering nozzle located on the main body.

Referring now to the drawings in detail wherein like reference numerals have been used throughout the various figures to designate like elements, there is shown in FIG. 1 a filter constructed in accordance with the principles of the present invention. The present invention is directed generally toward a filter that utilizes water which periodically must be c hang ed and can basically be used with any household vacuum cleaner.

Figure 4:
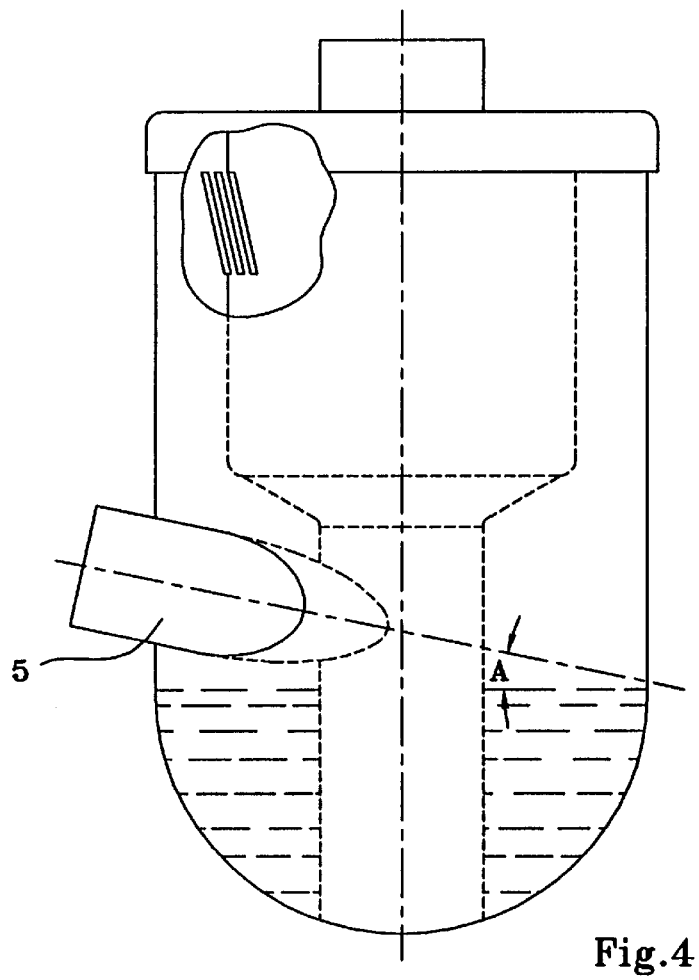
FIG. 4 is side view shown partially in cross-section from the direction of the line 4 of FIG. 1.
Figure 3:
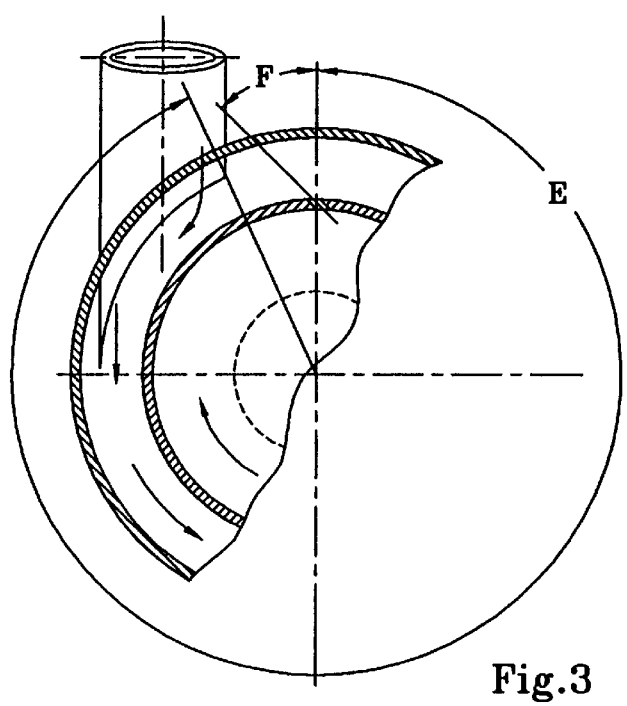
FIG. 3 is a cross-sectional view taken along line 3—3 of FIG. 1.
Figure 5:
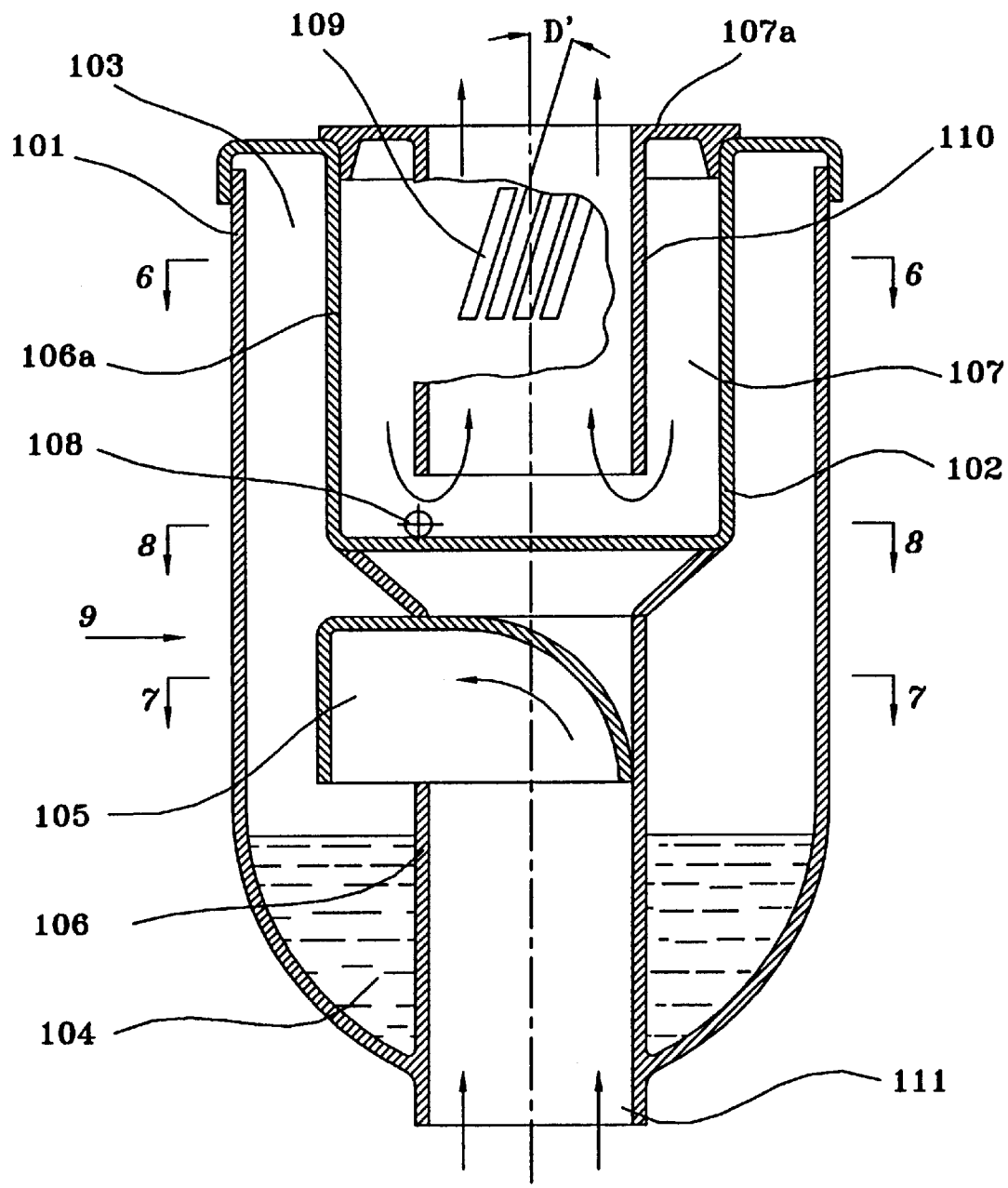
FIG. 5 is a second embodiment of the present invention for cleaning air with an entering nozzle located on the inside of the main body.
Figure 7:
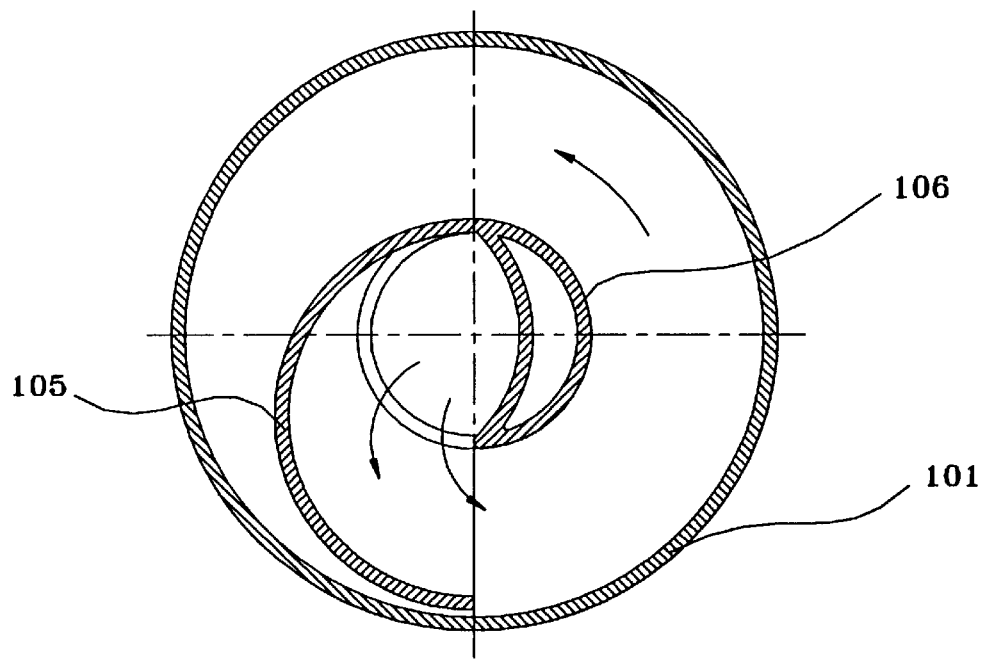
FIG. 7 is a cross-sectional view taken along line 7—7 of FIG. 5.

The first embodiment is seen in FIGS. 1–4. The device is comprised essentially of a main cylindrically shaped body 1 inside which a coaxial hollow cylinder 2 is located. These two cylinders form a ring-shaped or annular chamber 3 between them. Chamber 3 has a semi-spherically shaped bottom which is partially filled with water 4. The contaminated air is carried to the ring-shaped chamber 3 through the entrance nozzle 5 located above the water level and tangent to the ring-shaped chamber. The axis of the nozzle 5 faces the water at an angle A of between approximately 3–75 degrees when the main body 1 is in a vertical position (FIG. 4). The nozzle 5 is located on the main body 1.

The hollow cylinder 2 can be made of two pipes of different diameters. The smaller pipe 6 is in the lower part of the body 1, and the larger pipe 6a is on top. The smaller diameter allows for a larger volume of water in the body 1 around the pipe 6. Thus, a larger number of pollutants may be collected before the water needs to be changed.

Figure 2:
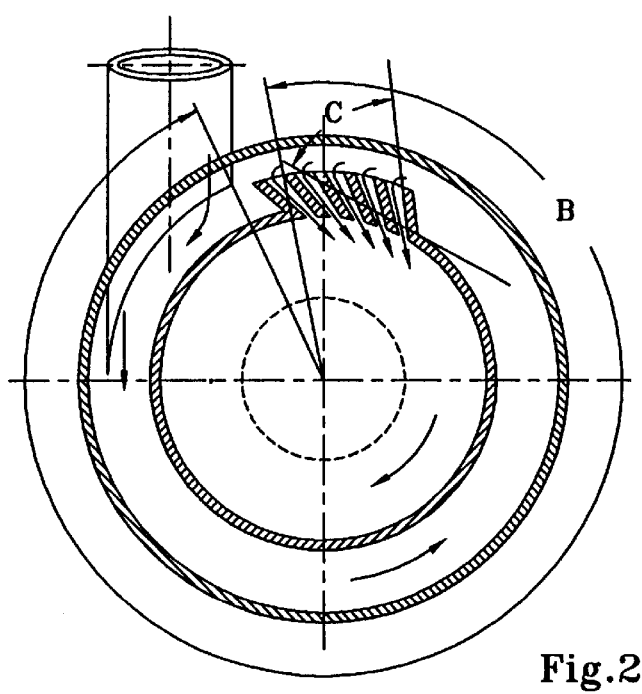
FIG. 2 is a cross-sectional view taken along line 2—2 of FIG. 1.

The pipe 6a has a cylindrical or annular chamber 7 therein with a bottom having a drain hole 8 located above entrance nozzle 5. The ring-shaped chamber 3 and the cylindrical chamber 7 are connected by an aerohydrodynamic separator or baffle means comprised of a plurality of louvers or fins 9 and passages. The louvers 9 are located in the top part of the pipe 6a, so that the angle between the entrance nozzle 5 and the louver farthest from the nozzle is at an angle B between approximately 250–360 degrees (FIG. 2). The louvers are directed opposite the direction of the air and water mixture at an angle C between approximately 5–60 degrees and downwardly into the cylindrical chamber 7 at approximately a 10–75 degree angle D (FIG. 1) to the axis of the main body 1.

The drain hole 8 is located on the side of the pipe 6a directly above the bottom, at an angle E of approximately between 180–360 degrees from the entrance nozzle 5. This hole 8 is opposite the direction of the water and air mixture flow and extends through the wall of the pipe 6a at a 5 to 60 degree angle F. (See FIG. 3)

The cylindrical chamber 7 has a lid 7a through which extends a cylindrical exiting or outlet nozzle 10 arranged coaxial to the cylinder 2. The bottom edge of the exiting nozzle 10 extends below the bottom of the separator 9.

Figure 9:
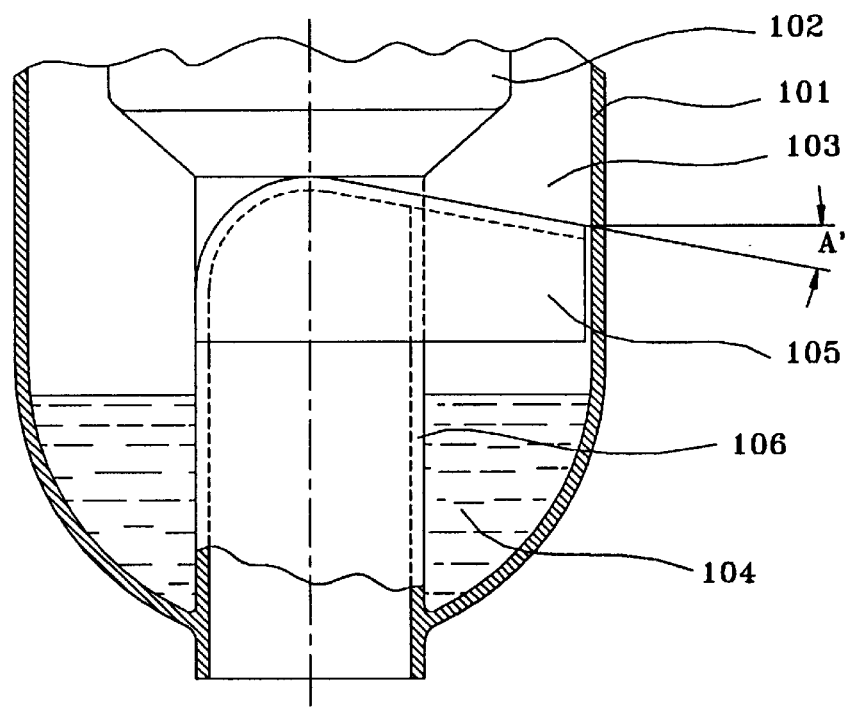
FIG. 9 is side view shown partially in cross-section from the direction of the line 9 of FIG. 5.
Figure 8:
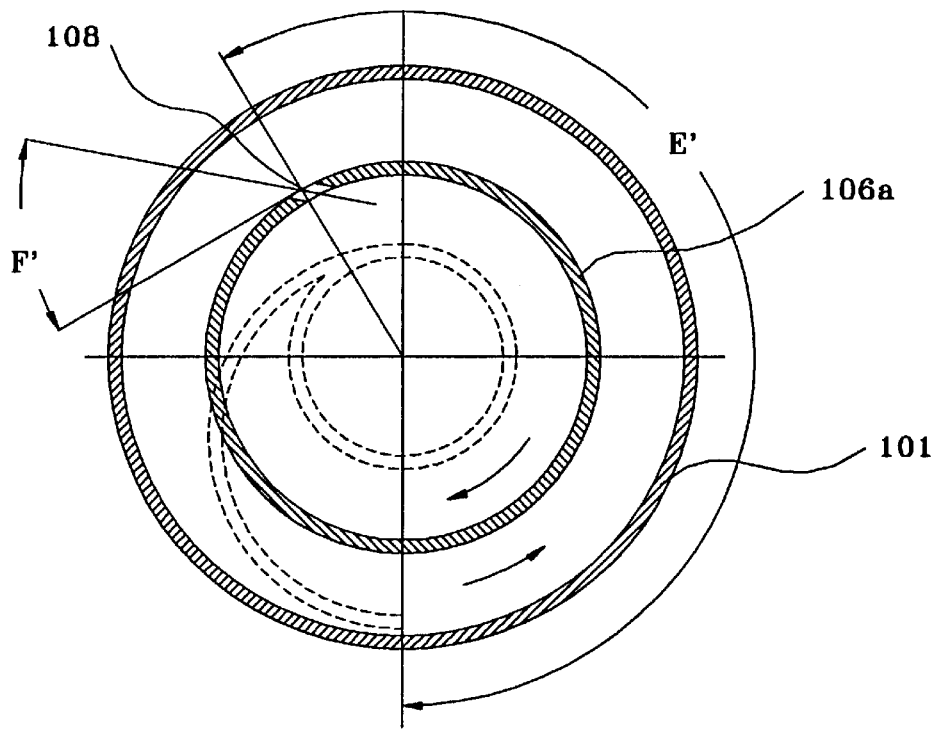
FIG. 8 is a cross-sectional view taken along line 8—8 of FIG. 5.

The second embodiment of the invention is shown in FIGS. 5–9 and functions in the same manner as the first embodiment. As in the first embodiment, the device is comprised of a main cylindrically shaped body 101 inside which a coaxial hollow cylinder 102 is located. These two cylinders form a ring-shaped or annular chamber 103 between them. Chamber 103 has a semi-spherically shaped bottom which is partially filled with water 104. The contaminated air is carried to the ring-shaped chamber 103 through opening 111 at the bottom center of pipe 106. The air moves vertically upwardly through the center of the pipe 106 where it is then directed horizontally and exits nozzle 105 located above the water level and in a direction tangent to the ring-shaped chamber. The axis of the exit of the nozzle 105 faces the water at an angle A' of between approximately 3–75 degrees when the main body 101 is in a vertical position (FIG. 9).

The hollow cylinder 102 can be made of two pipes of different diameters. The smaller pipe 106 is in the lower part of the body 101, and the larger pipe 106a is on top. The smaller diameter allows for a larger volume of water in the body 101 around the pipe 106. Thus, a larger number of pollutants may be collected before the water needs to be changed.

Figure 6:
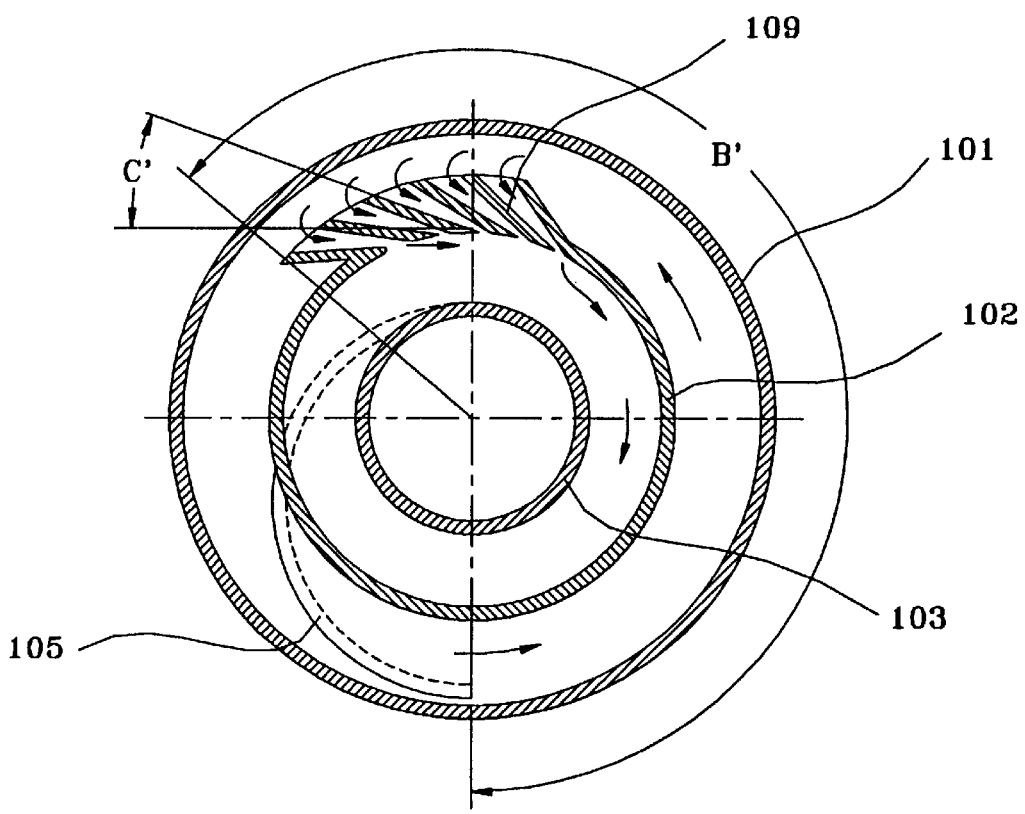
FIG. 6 is a cross-sectional view taken along line 6—6 of FIG. 5.

The pipe 106a has a cylindrical or annular chamber 107 therein with a bottom having a drain hole 108 located above nozzle 105. The ring-shaped chamber 103 and the cylindrical chamber 107 are connected by an aerohydrodynamic separator or baffle means comprised of a plurality of louvers or fins 109 and passages. The louvers 109 are located in the top part of the pipe 106a, so that the angle between the nozzle 105 and the louver farthest from the nozzle is at an angle B' between approximately 250–360 degrees (FIG. 6). The louvers are directed opposite the direction of the air and water mixture at an angle C' between approximately 5–60 degrees and downwardly into the cylindrical chamber 107 at approximately a 10–75 degree angle D' (FIG. 5) to the axis of the ma in body 101.

The drain hole 108 is located on the side of the pipe 106a directly above the bottom, at an angle E' of approximately between 180–360 degrees from the nozzle 105. This hole 108 is opposite the direction of the water and air mixture flow and extends through the wall of the pipe 106a at a 5 to 60 degree angle F'. (See FIG. 8.) As a result, the air passing over the opening of the hole 108 causes a reduced pressure relative to the inside of chamber 107 whereby the water accumulating at the bottom of the chamber 107 will be drawn out and into the main body of water 104.

The cylindrical chamber 107 has a lid 107a through which extends a cylindrical exiting or outlet nozzle 110 arranged coaxial to the cylinder 102. The bottom edge of the exiting nozzle 110 extends below the bottom of the separator 109.

Figure 10:
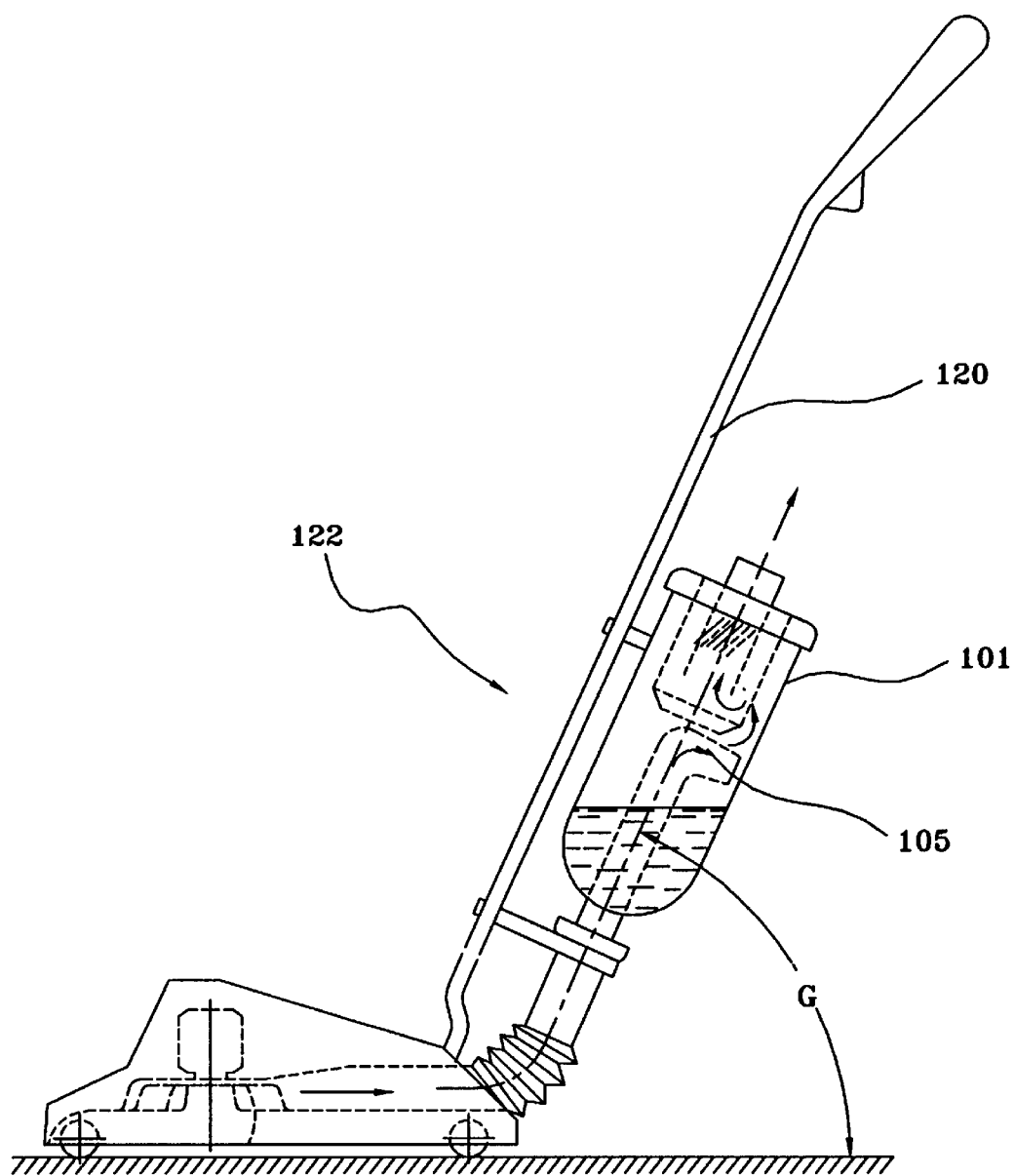
FIG. 10 is schematic representation of the present invention incorporated into an upright vacuum cleaner.

Either of the embodiments described above can be used as an air filter by itself or can be fixed onto a portable vacuum cleaner. For example, it could be mounted on the handle of upright household vacuum cleaner as shown in FIG. 10.

For a better understanding of the invention, the operation of the same will now be described. References herein are primarily to the second embodiment of the invention. It should be understood that the first embodiment works in a similar manner. The device works when the axis of body 101 is vertical or slanted up to about 10 degrees from the ground as shown at angle G in FIG. 10. The device can be comfortably installed onto the handle 120 of an upright vacuum cleaner 122 whose handle is constantly slanted up and down. However, the device must be fixed onto the handle so that the entering nozzle 105 is facing downwardly in an inclined position.

The polluted air enters the ring-shaped chamber 103 through the nozzle 105, where it mixes with the water 104, due to kinetic energy. During this process, the water moistens the dirt particles, or the pollutants, which then remain in the water. The first stage of separation of the air and water mixture thus takes place in the ring-shaped chamber 103. Afterward, the water-air mix moves up spirally inside the ring-shaped chamber 103, to the louvers of the aerohydrodynamic separator 109. As this takes place, a centrifugal separation of the water-air mixture occurs. The heavier water gathers on the inner sides of the body 101 and slides back down to the main mass of water. Large particles of pollutants, which don't moisten well, such as silica, are also separated from the air by the centrifugal force, and then fall to the bottom along with the water sliding down.

Due to the semi-spherical bottom of chamber 103, the flow of the water and air mixture moves fluently along the inside the surface of body 101 even when the device is in an inclined position. Fluent movement a long the concave walls ensures the quality of separation of the water from the air in the air-and-water mixture, and large particles, such as silica, from the air. Usually such large particles wet poorly and stay in the air.

The second stage of the air-from-water separation is performed by the aerohydrodynamic separator 109. Going past the louvers, the air and water mixture splits because the air is able to go through the slots and move into the cylindrical chamber 107. Being heavier than the air, the drops of water have a greater inertia, so they move past the louvers and stay in the ring-shaped chamber 103. The louvers direct the air flow tangent to the cylindrical chamber 107 in the direction opposite the one in chamber 103, i.e., clockwise as viewed in FIG. 6. This centrifugally separates the remaining water from the air in the cylindrical chamber 107, the same way it did in chamber 103. The separation in the cylindrical chamber 107 can be considered the third stage of separation. Once rid of all the pollutants, the air leaves through nozzle 110. The water that collects at the bottom of chamber 107 rejoins the main body of water 104 in chamber 103 through opening 108.

In both of the embodiments, the concentric placement of the chambers allows not only for a compact design, it also allows the main body and hollow cylinder to create a circular flow of the water and air mixture along the inner side of the main body. As a result, the quality of the separation improves compared to ordinary cylindrical cyclones. Also, in cyclones only a small part of the air flow moves along the inner wall, the rest flows freely in the cylindrical shape, often moving in opposite directions creating vortices. This is one of the reasons why ordinary cyclones cannot rid the air of particles smaller than 5 microns. Another advantage of placing the chambers inside each other is that they create extra walls to which the water clings.

Also, in both embodiments an area of cross-section at any given place within the device where air passes, is equal to or greater than the area of cross-section of the entrance or inlet nozzle.

While water has been described as the liquid used in the present filtering system, other liquids well known in the art may also be used. Furthermore, to improve the water's ability to capture air pollutants, surfactants can be added. For best separation of the air and water mixture, the parts of the scrubber should be made of materials which are well moistened by the liquid used in the scrubber.

The present invention may be embodied in other specific forms without departing from the spirit or essential attributes thereof and accordingly, reference should be made to the appended claims rather than to the foregoing specification as indicating the scope of the invention.

I claim:

1. A filtering system for cleaning air comprising:
   a first annular chamber having a quantity of liquid at the bottom thereof;

inlet means for directing air across the upper surface of said liquid in a substantially tangential direction to cause said air to circulate in a first circular direction within said first chamber, said inlet means including an inlet pipe extending into the interior of said first annular chamber from the bottom thereof;

a second annular chamber concentric with said first chamber and in fluid communication with said first chamber to thereby allow said circulating air from said first chamber to pass into said second chamber;

means for causing air within said second chamber to circulate in a second circular direction, opposite to said first circular direction, and outlet means for allowing filtered air to exit from said second chamber.

2. The filtering system as claimed in claim 1 wherein said first annular chamber includes a first outer wall and a first inner wall.

3. The filtering system as claimed in claim 2 wherein said second annular chamber includes a second outer wall which is said first inner wall.

4. The filtering system as claimed in claim 2 wherein said inlet means includes an opening in said first outer wall above the level of said liquid.

5. The filtering system as claimed in claim 3 wherein said second chamber includes an opening in said second outer wall, said opening allowing any liquid to return to said liquid at the bottom of said first chamber.

6. The filtering system as claimed in claim 1 wherein said bottom of said first chamber is curved.

7. The filtering system as claimed in claim 1 wherein said bottom of said first chamber is semi-spherical.

8. The filtering system as claimed in claim 1 wherein said second chamber is above the level of said liquid.

9. The filtering system as claimed in claim 1 wherein said means for causing air to circulate includes a baffle means.

10. The filtering system as claimed in claim 9 wherein said baffle means includes passages between said first and second chambers, said passages being aligned in such a manner so that the air circulates in said second circular direction.

11. The filtering system as claimed in claim 9 wherein said baffle means includes fins.

12. The filtering system as claimed in claim 1 wherein said inlet pipe and said first annular chamber are coaxial.

13. The filtering system as claimed in claim 1 wherein said outlet means includes a nozzle.

14. The filtering system as claimed in claim 13 wherein said nozzle and said second chamber are coaxial.

15. The filtering system as claimed in claim 1 wherein an area of cross-section at any given place within the system where the air passes being equal to or greater than the area of cross-section of said inlet means.

16. A filtering system for cleaning air comprising:

a first annular chamber having a quantity of liquid at the bottom thereof;

inlet means for directing air across the upper surface of said liquid in a substantially tangential direction to cause said air to circulate in a first circular direction within said first chamber;

a second annular chamber concentric with said first chamber and in fluid communication with said first chamber to thereby allow said circulating air from said first chamber to pass into said second chamber;

means for causing air within said second chamber to circulate in a second circular direction, opposite to said first circular direction, and outlet means including a nozzle for allowing filtered air to exit from said second chamber.

17. The filtering system as claimed in claim 16 wherein said nozzle and second chamber are coaxial.

* * * * *